(12) United States Patent
Zitzke

(10) Patent No.: US 10,912,335 B2
(45) Date of Patent: Feb. 9, 2021

(54) ELECTRONIC SMOKING DEVICE AND CAPSULE SYSTEM

(71) Applicant: FONTEM HOLDINGS 1 B.V., Amsterdam (NL)

(72) Inventor: Roland Zitzke, Bienenbuttel (DE)

(73) Assignee: FONTEM HOLDINGS 1 B.V., Amsterdam (NL)

( * ) Notice: Subject to any disclaimer, the term of this patent is extended or adjusted under 35 U.S.C. 154(b) by 530 days.

(21) Appl. No.: 15/321,947

(22) PCT Filed: Jun. 12, 2015

(86) PCT No.: PCT/EP2015/001206
§ 371 (c)(1),
(2) Date: Dec. 23, 2016

(87) PCT Pub. No.: WO2015/197165
PCT Pub. Date: Dec. 30, 2015

(65) Prior Publication Data
US 2017/0135402 A1    May 18, 2017

(30) Foreign Application Priority Data
Jun. 27, 2014  (EP) ..................................... 14002222

(51) Int. Cl.
*A24F 47/00*    (2020.01)
*H04L 9/06*    (2006.01)
(Continued)

(52) U.S. Cl.
CPC .......... *A24F 47/008* (2013.01); *H04L 9/0643* (2013.01); *H04L 9/3236* (2013.01); *H05B 1/0244* (2013.01); *H05B 2203/021* (2013.01)

(58) Field of Classification Search
CPC . H04L 9/32; H04L 9/3236; H04L 9/06; A24F 47/002; A24F 47/004;
(Continued)

(56) References Cited

U.S. PATENT DOCUMENTS 9,025,291 B2    5/2015 Xiang
9,330,270 B2 *  5/2016 Ochiai .................... H04L 9/002
(Continued)

FOREIGN PATENT DOCUMENTS

CN    102894486 A    1/2013
CN    103815549 A    5/2014

OTHER PUBLICATIONS

Paar et al., Understanding Cryptography, 2011, Springer; 1st ed. 2010 edition (Year: 2011).*
(Continued)

*Primary Examiner* — Khang Do
(74) *Attorney, Agent, or Firm* — Perkins Coie LLP; Kenneth H. Ohriner

(57) ABSTRACT

In an electronic smoking system, a capsule (6) contains a liquid (28) to be supplied to an atomizer (20) and is mounted on an electronic smoking device (1). The capsule (6) may have a controller (40), which receives data from and transmits data to control electronics (14) of the electronic smoking device (1). The control electronics (14) of the electronic smoking device (1) and the controller (40) of the capsule (6) are adapted to execute a challenge response authentication.

14 Claims, 4 Drawing Sheets

(51) Int. Cl.
*H04L 9/32* (2006.01)
*H05B 1/02* (2006.01)

(58) Field of Classification Search
CPC ....... A24F 47/008; B65D 47/36; B65D 47/38; A61M 15/06; H05B 1/0244
See application file for complete search history.

(56) References Cited

U.S. PATENT DOCUMENTS

| | | | |
|---|---|---|---|
| 2005/0016549 A1* | 1/2005 | Banerjee | A24B 15/16 131/194 |
| 2005/0081846 A1 | 4/2005 | Barney | |
| 2009/0151717 A1* | 6/2009 | Bowen | A61M 15/0035 128/200.23 |
| 2009/0283103 A1* | 11/2009 | Nielsen | H02J 7/0044 131/273 |
| 2011/0036346 A1 | 2/2011 | Cohen et al. | |
| 2011/0226236 A1* | 9/2011 | Buchberger | A61M 15/0086 128/200.23 |
| 2013/0220315 A1 | 8/2013 | Conley et al. | |
| 2013/0298905 A1* | 11/2013 | Levin | A24F 47/008 128/202.21 |
| 2014/0060455 A1 | 3/2014 | Collett et al. | |
| 2014/0096781 A1* | 4/2014 | Sears | A24F 47/008 131/328 |
| 2014/0144429 A1* | 5/2014 | Wensley | A61M 15/06 128/200.14 |
| 2014/0190477 A1* | 7/2014 | Qiu | A61M 11/042 128/202.21 |
| 2014/0190496 A1* | 7/2014 | Wensley | A61M 15/0065 131/273 |
| 2014/0261408 A1* | 9/2014 | DePiano | A24F 47/008 128/202.21 |
| 2014/0261495 A1* | 9/2014 | Novak | A24F 47/008 131/329 |
| 2014/0270730 A1* | 9/2014 | DePiano | A24F 47/008 392/404 |
| 2014/0283859 A1* | 9/2014 | Minskoff | A24F 47/008 131/329 |
| 2014/0299137 A1 | 10/2014 | Kieckbusch et al. | |
| 2014/0305454 A1* | 10/2014 | Rinker | H05B 3/26 131/329 |
| 2015/0101625 A1 | 4/2015 | Newton et al. | |
| 2015/0114409 A1* | 4/2015 | Brammer | A24F 47/008 131/329 |
| 2015/0216237 A1* | 8/2015 | Wensley | A24F 47/008 131/273 |
| 2015/0223522 A1* | 8/2015 | Ampolini | A24F 47/008 131/328 |
| 2015/0245654 A1* | 9/2015 | Memari | H02J 50/10 141/2 |
| 2015/0245659 A1* | 9/2015 | DePiano | A24F 47/008 392/397 |
| 2016/0050975 A1 | 2/2016 | Worm et al. | |
| 2016/0081395 A1* | 3/2016 | Thorens | A24F 47/008 128/202.21 |
| 2016/0219938 A1 | 8/2016 | Mamoun et al. | |
| 2016/0345629 A1* | 12/2016 | Mironov | A24B 15/16 |
| 2016/0345630 A1* | 12/2016 | Mironov | B32B 5/024 |

OTHER PUBLICATIONS

European Patent Office, "Extended European Search Report", for EP14002222, dated Nov. 27, 2014, 5 pgs.
European Patent Office, "International Search Report", for PCT/EP2015/001206, dated Sep. 29, 2015, 1 pgs.
State Intellectual Property Office, First Office Action for Chinese Application No. 201580036975.2; dated Mar. 4, 2019; 8 pages.
State Intellectual Property Office, Second Office Action for Chinese Application No. 201580036975.2 with Machine English Translation; dated Jan. 3, 2020; 8 pages.

* cited by examiner

ELECTRONIC SMOKING DEVICE AND CAPSULE SYSTEM

An electronic smoking device, such as an electronic cigarette, usually includes a housing accommodating an electric power source (e.g., a battery or a rechargeable battery), an electrically heatable atomizer including an electric heater adapted to atomize a liquid supplied from a reservoir (capsule) in order to provide an aerosol exiting from the atomizer. Control electronics control activation of the heater of the atomizer. A puff detector provided within the electronic smoking device is arranged to detect a user puffing on the device (e.g., by sensing an under-pressure or an air flow pattern through the device) and signals the puff to the control electronics. When a signal is detected the control electronics activate the atomizer, which creates an aerosol, referred to here as "atomizing". The aerosol created may include vapour as well as gaseous and smoke constituents.

In many electronic smoking devices the liquid container, such as a capsule or cartridge) containing liquid to be atomized is disposable and the user simply replaces the container as a whole when it is empty or when a different type of liquid is to be atomized.

However, this allows users to use a replacement container that may not meet the quality and technical specifications of device manufacturer. Accordingly there is a need for an electronic smoking device and a capsule system in which the authenticity of a liquid container or capsule can be confirmed.

SUMMARY OF THE INVENTION

In one aspect an electronic smoking device may include a housing, control electronics, and a puff detector. The housing may hold a battery for powering an atomizer (e.g., an electrically heatable atomizer), which atomizes a liquid supplied from the capsule to provide an aerosol. The control electronics controls the atomizer (e.g., by controlling its heater). The puff detector indicates an aerosol inhaling puff to the control electronics.

A container or capsule contains the liquid to be supplied to the atomizer The capsule may include a controller which receives data from the control electronics of the electronic smoking device and to transmit data to the control electronics. Moreover, the capsule may have a wired or wireless communication device which is adapted to transfer the data. The control electronics of the electronic smoking device and the controller of the capsule may be adapted to execute a challenge response authentication. If the capsule is not able to authenticate, it can be disregarded by the electronic smoking device, for example by not operating a heater of the atomizer.

BRIEF DESCRIPTION OF THE DRAWINGS

In the drawings the same element number indicates the same element in each of the views.

DETAILED DESCRIPTION OF THE EMBODIMENTS

Figure 1:
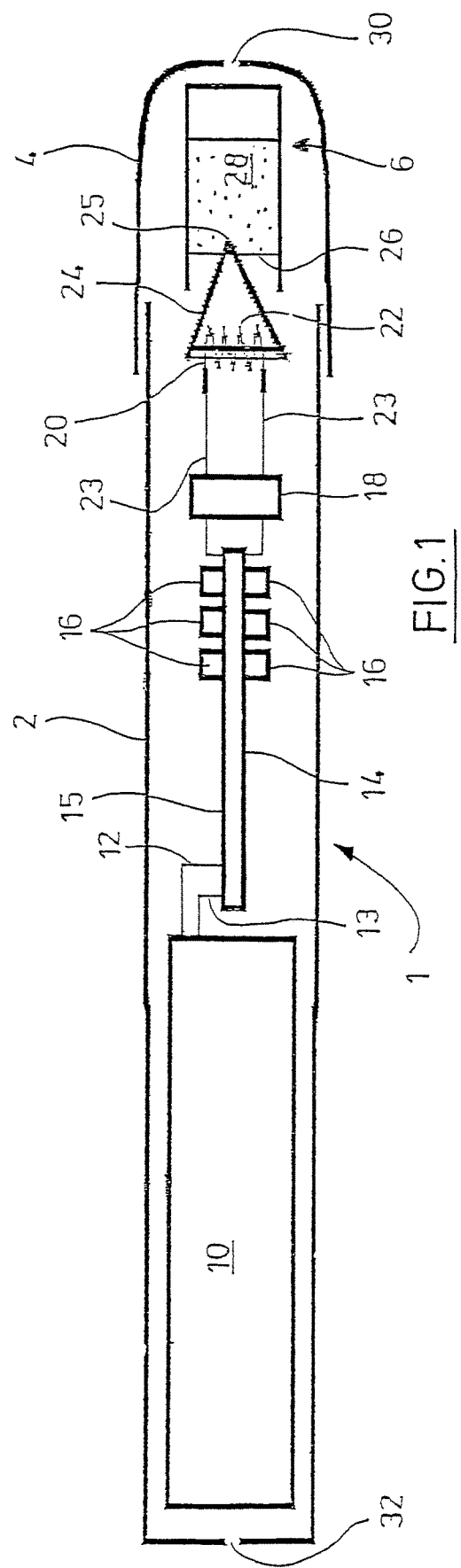
FIG. 1 is a schematic longitudinal section view of an electronic smoking device and a capsule.

As shown in FIG. 1, an electronic smoking device 1 may have a cylinder-like housing 2 and a mouthpiece 4, which is designed as a detachable cap. Removing the mouthpiece 4 provides access to a replaceable capsule 6, which serves as a reservoir for a liquid and also contains an electronic controller.

A battery 10 in the housing may be a re-chargeable lithium ion battery and may include its' own circuitry. The battery 10 is connected, via leads 12 and 13, to control electronics 14, which typically includes integrated circuits mounted on a printed circuit board 15. The printed circuit board 15 may also support a plurality of light-emitting diodes (LEDs) 16, which are assembled behind respective windows provided in the housing 2 and indicate the current status of the electronic smoking device 1.

A puff detector 18 is connected to the control electronics 14. The puff detector 18 may be an inhalation sensor, which detects the vacuum generated inside the housing 2 when a user inhales at the mouthpiece 4.

An atomizer 20 has a heater 22 connected via leads 23 to the control electronics 14. The heater 22 includes a heating wire optionally mounted at a ceramics shell which also supports a wick 24 made of braided metal or sponge-like material, fibers, sintered metal, or similar liquid conveying element. A piercing tip 25 at the distant end of the wick 24 is able to penetrate a membrane 26 used for sealing the capsule 6 so that liquid 28 contained in the capsule 6 can be guided out of the capsule 6 and through the wick 24 to the area of the heater 22.

At its free end, the mouthpiece 4 has an inhalation aperture 30. At the opposite end of the electronic smoking device 1, a charging port 32 is provided which permits re-charging of the battery 10, e.g. via a USE port.

To use the electronic smoking device 1, a consumer inserts a fresh capsule 6 into the housing 2 so that the capsule membrane 26 is pierced and liquid is supplied from the capsule 6 via the wick 24 to the area of the heater 22. When the consumer inhales at the inhalation aperture 30, the puff detector 18 senses the resulting vacuum inside the housing 2 and sends a puff signal to the control electronics 14. In response, the control electronics turns on the heater 22 which atomizes nearby liquid and creates an aerosol, which is inhaled by the consumer. The heater 22 may remain switched on for a predetermined period of time.

The heater 22 may be provided in various other forms of direct heating and indirect heating of the liquid, each having advantages. In direct heating designs, the liquid directly contacts the heating element, which may be a wire coil, rod or other heater surface. In indirect heating designs, the liquid contacts a surface heated by a separate heating element, which does not come into direct contact with the liquid. Other types of atomizers or vaporizers may alternatively be used. Various ultrasonic atomizers are effective in creating vapour without heating. For example, an ultrasonic atomizer using a free-running Colpitts oscillator generates high-frequency energy in the range between 800 kHz and 2000 kHz driving a piezoelectric vibrator converting liquid into vapour. Atomizers having electrostatic, electromagnetic or pneumatic elements have also been proposed.

Figure 2:
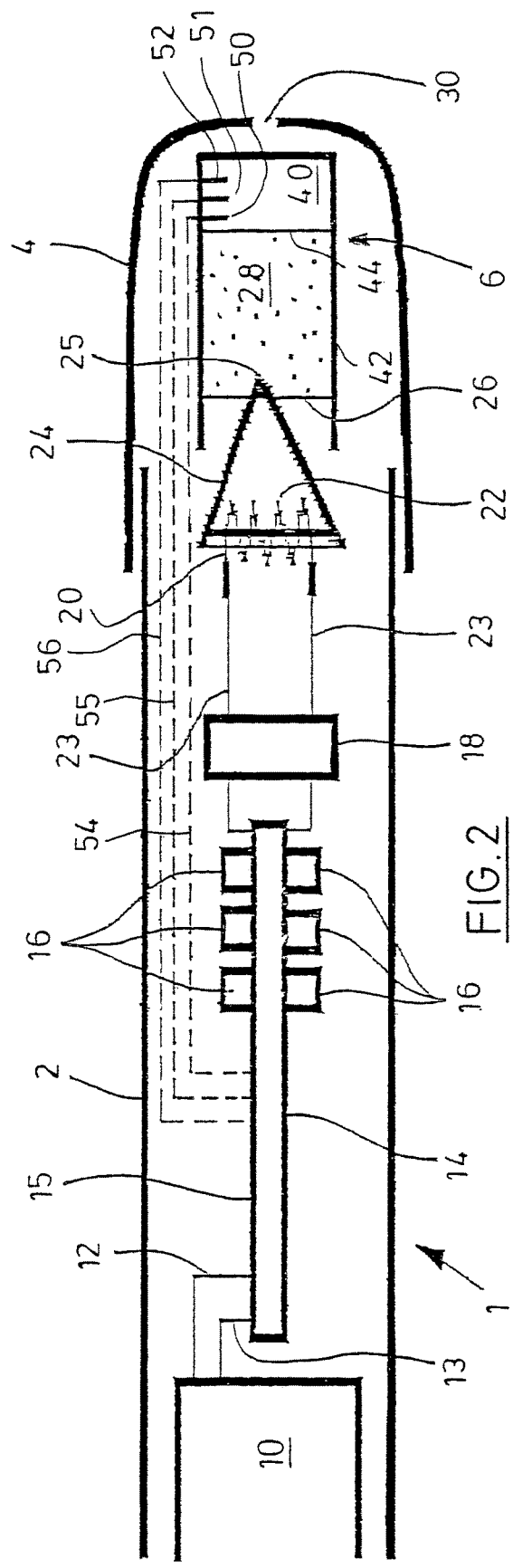
FIG. 2 is an enlarged schematic longitudinal section of the capsule of FIG. 1.

FIG. 2 is an enlarged view similar to FIG. 1 and illustrates a capsule 6 containing an electronic controller 40 including a processor. The capsule 6 has a housing formed as a shell 42 optionally made of plastic material, and the controller 40 is accommodated in a cavity of the shell 42 preferably separated from the liquid 28 by an intermediate wall 44. The controller 40 is electrically connected to the control electronics 14 of the electronic smoking device 1 by means of three electrical contacts 50, 51 and 52 at an outer face of the shell, three related counter-contacts arranged in the electronic smoking device 1 opposite to the contacts 50, 51, 52, and three leads 54, 55 and 56 connecting these counter-contacts to the control electronics 14. In the example shown, the contact 50 and lead 54 designates a common ground, the contact 51 and the lead 55 provide a line for permanently powering the controller 40, and the contact 52 and the lead 56 provide a signal line for data transfer.

Figure 3:
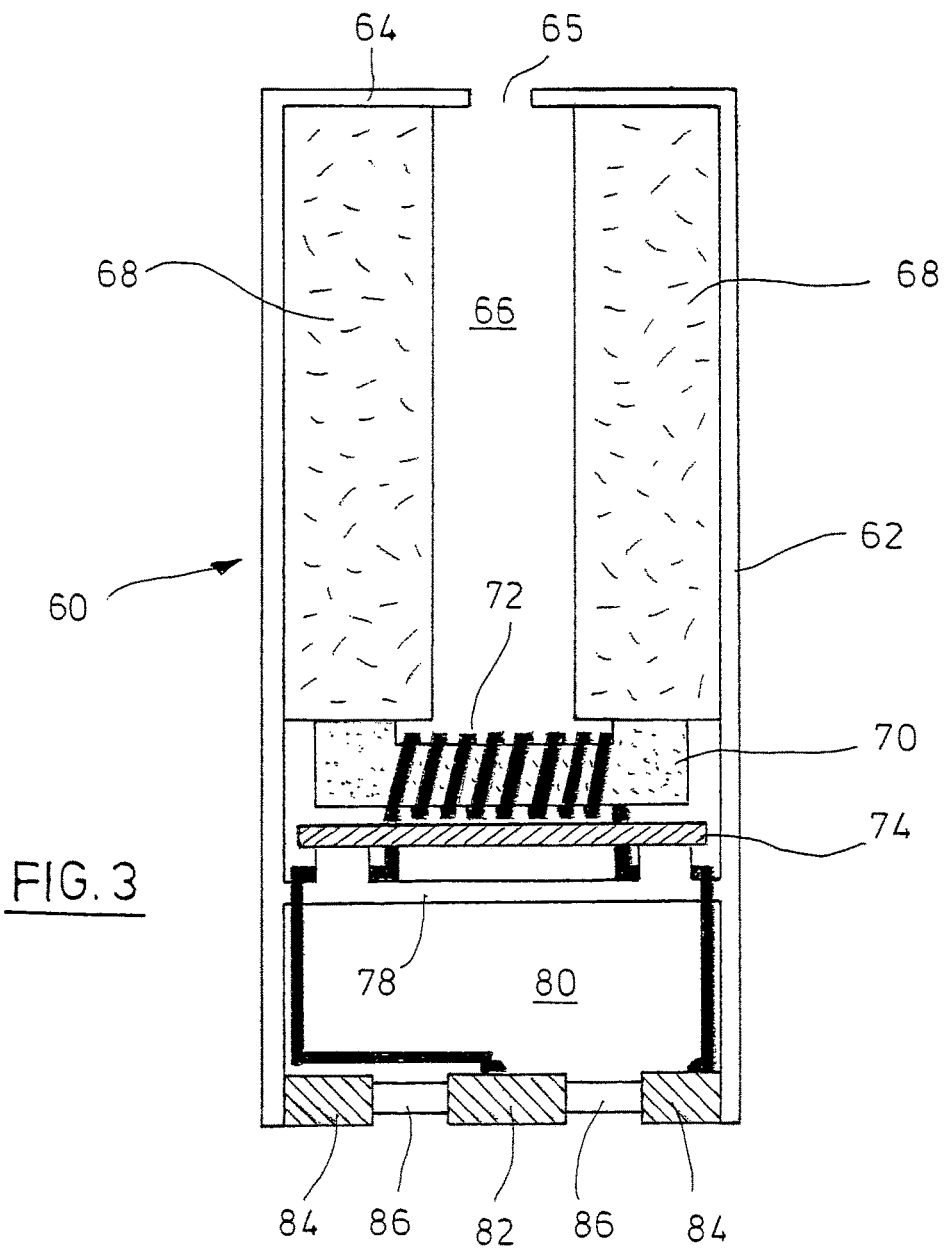
FIG. 3 is a schematic longitudinal section of another embodiment of the capsule, in which an atomizer is integrated.

FIG. 3 shows an alternative capsule 60 referred to as a "cartomizer" (from "cartridge" and "atomizer") because an atomizer is integrated into the cartridge or capsule.

Figure 4:
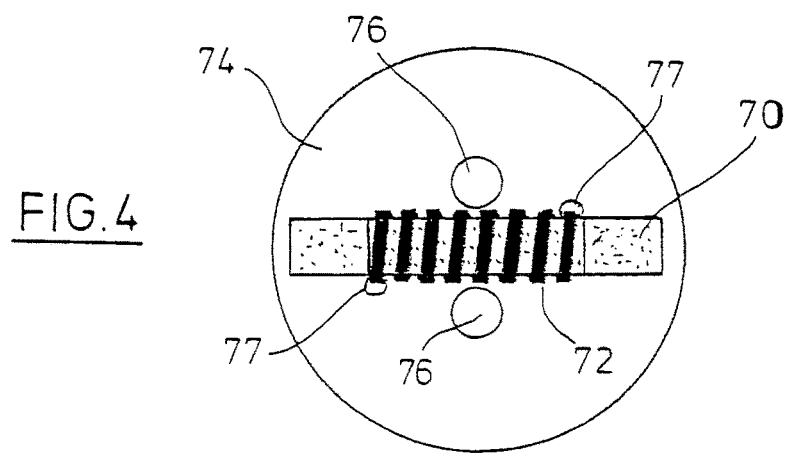
FIG. 4 is a top view of a support plate used for holding part of the atomizer of the capsule according to FIG. 3.

In this embodiment, the cartomizer 60 has a cylindrical casing 62 optionally made of plastic material and including an end wall 64 having a centre opening 65. The casing 62 contains an internal cavity 66 filled in its peripheral (but nevertheless major) area with a liquid holding material such as polyester fleece that is soaked with the liquid to be atomized. Thus, this material forms a reservoir 68 for the liquid. For guiding the liquid out of the reservoir 68, a wick bracket 70 made of porous $SiO_2$ is used, which touches the reservoir 68 at its ends. A heating wire 72 is wound about the wick bracket 70. Referring also to FIG. 4, the wick bracket 70 including the heating wire 72 is mounted on a support plate 74 of e.g. a ceramics material, which has two ventilation holes 76 and two small holes 77 through which the ends of the heating wire 72 are guided.

The support plate 74 provides for sufficient heat shielding so that an intermediate wall 78 does not overheat during operation of the heating wire 72. The intermediate wall 78 separates the atomizer area of the cartomizer 60 from an additional compartment housing a controller 80 as well as a small battery for powering the controller 80 and a wireless communication device. In a variant of the embodiment, some electrical contacts are provided at the lateral wall of the compartment, which permit the transfer of electrical power from the battery of the electronic smoking device to the controller 80 and the transfer of data between the controller 80 and the control electronics of the electronic smoking device. The controller may be used for challenge response authentication, like controller 40 of capsule 6.

The leads of the heating wire 72 are guided through the compartment of the controller 80 and are soldered to a central inner contact 82 and an annular outer contact 84, respectively, arranged in a coaxial way, with insulation material 86 in between.

The cartomizer 60 can be mounted at an electronic smoking device adapted to this type of capsule so that the contacts 82 and 84 electrically connect with corresponding contacts of the electronic smoking device, which are connected to control electronics similar to the control electronics 14. When a puff detector similar to puff detector 18 senses a puff, the control electronics provides electrical current to the heating wire 72 via a battery in the electronic smoking device. The heating wire 72 heats the wick bracket 70, and the liquid entering the porous wick bracket 70 from the porous reservoir 68 by capillary forces is atomized into the cavity 66. The aerosol thus created leaves the cavity 66 via the opening 65. Ventilation holes of the capsule 60 in the vicinity of the heating wire 72 may be provided to improve the flow of the aerosol.

Similar to the embodiment illustrated in FIGS. 1 and 2, the control electronics of the electronic smoking device of FIGS. 3-4 may be adapted to perform a challenge response authentication with the controller 80 of the cartomizer 60.

Figure 6:
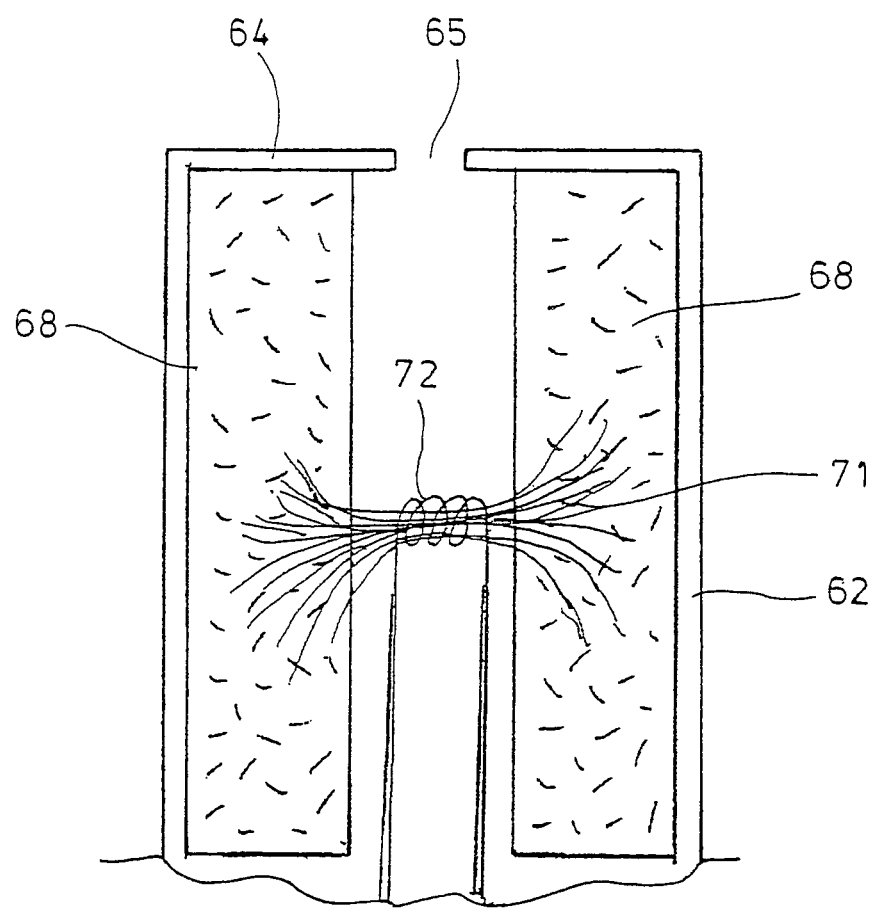
FIG. 6 is a schematic partial longitudinal section of another capsule embodiment.

FIG. 6 shows another embodiment with the heating wire 72 in the form of a coil at a generally central position of the reservoir 68. The heating wire 72 is wound around a bundle of fibers 71 that project into or otherwise contact the reservoir. In use liquid is carried via the bundle of fibers to the heating wire 72 where the liquid is heated to form a vapour.

Figure 5:
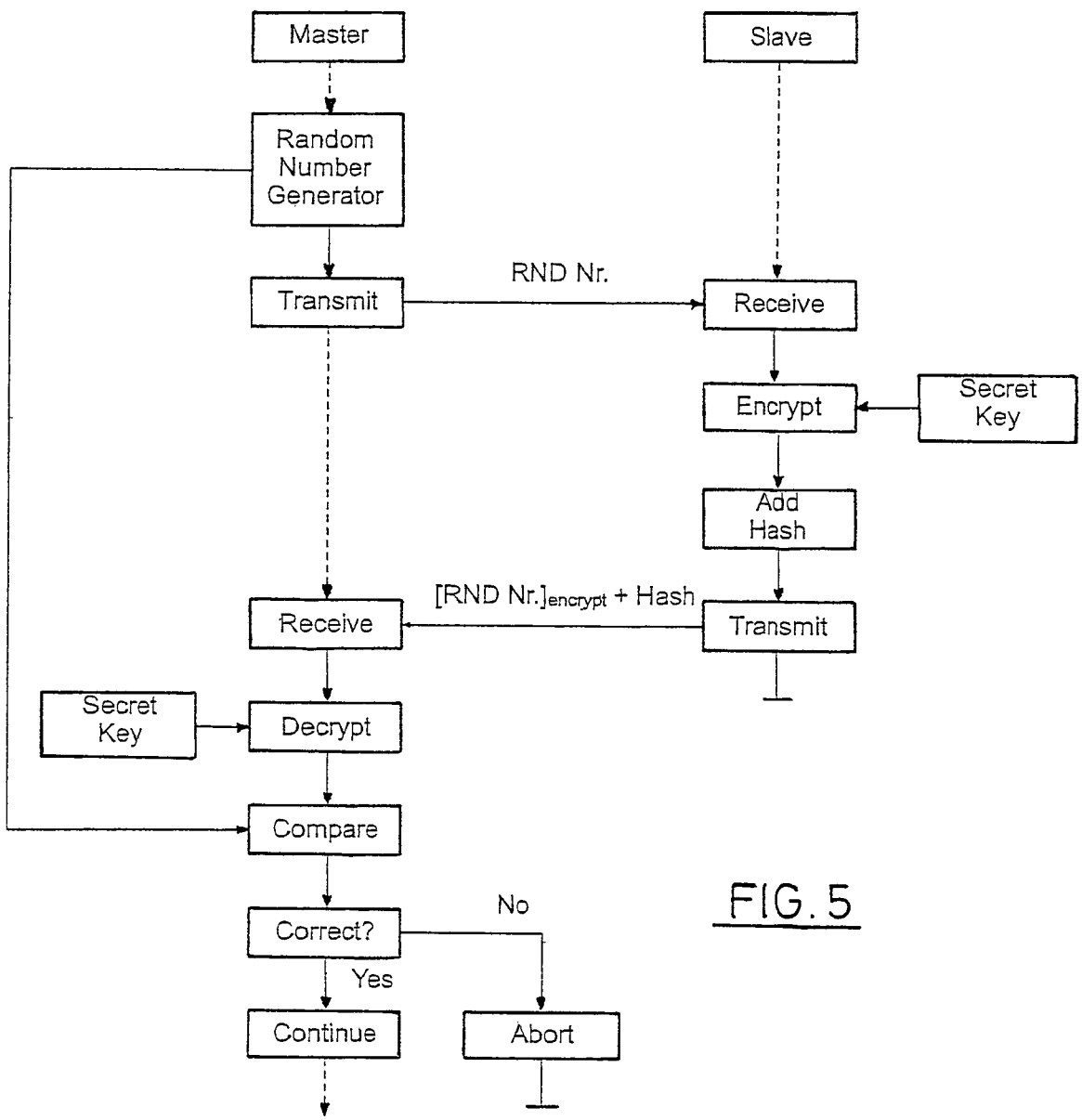
FIG. 5 is a flow chart illustrating challenge response authentication.

FIG. 5 shows a flow diagram illustrating the course of a challenge response authentication, as executed by capsule 6 when mounted at the electronic smoking device 1 or by cartomizer 60 when mounted at a corresponding electronic smoking device.

The left or master side of FIG. 5 displays the steps executed by the control electronics of the electronic smoking device, and the right or servant side displays the steps executed by the controller of the capsule. In this embodiment, the capsule is connected to the electronic smoking device by means of a bidirectional electrical communication which allows the transmission of sequences of digital "1" and "0" values.

Both the electronic smoking device and the capsule contain a shared digital token (or key) which is kept secret and which is never transmitted. This token may be a sequence of "1" and "0" values.

Communication is then established by creating a random number (RND Nr.) which is sent from the master side to the servant side of the system. The random number is created by the control electronics of the electronic smoking device, i.e. by the master side.

The servant side applies its known secret key to the random number using a standard cryptographic algorithm (e.g., AES or similar) and uses a standard hash algorithm to add a hash key. This information is then sent back to the master side. The master side uses the same cryptographic algorithm and the same hash algorithm as the servant side and is therefore able to check the hash value and to decrypt the transmitted value again. If the result is the random number originally sent, the master side can be reasonably sure that the servant side or capsule is authentic as it has the common secret key and that communication is secure and can continue. Alternatively, the master side may compare the transmitted value to the encrypted original random number.

The comparison of the received encrypted random number with the computed encrypted random number (applying the known random number and the known encryption including the secret key) can also be expressed as a comparison of the received encrypted random number after decryption (involving the known encryption including the secret key) with the original random number. Both approaches are to be covered by the invention as defined in the claims.

Thus, the control electronics of the electronic smoking device and the controller of the capsule share a common secret key which, however, cannot be read out of the electronic components. On the other hand, all data transferred via electrical contacts (or wireless) a third party could interfere with are encrypted.

In a variant, the original random number is produced in the capsule so that the master and servant functions are reversed.

In a more complex embodiment, all parts of the communication can be encrypted to prevent external equipment from being used to interfere with or analyze the communication between the electronic smoking device and the capsule.

In the above embodiment, a system has been described where a capsule 6 is provided with three electrical contacts 50, 51 and 52 providing for connection to a common ground 50,54, a line 51,55 for permanently powering the controller 40, and a signal line 52, 56 for data transfer. In some embodiments only two electrical contacts may be provided and a capacitor may be provided in the capsule 6 to store charge and power the electronic controller 40 or 80 in intervals when it is not powered directly by the a battery 10. In such embodiments the capsule 6 may additionally include a diode to prevent discharging of the capacitor when the capacitor powers the electronic controller 40 or 80.

Generally, two electrical contacts are required to power the controller in the capsule via the battery of the electronic smoking device. On the other hand, to transmit digital information, a signal line has to be put to voltage levels representing two different states, e.g. ground voltage level for logical "0" and a distinctly different positive (or negative) voltage level for logical "1" or for separating ground voltage level signals of different duration. To achieve the supply of power and the transmission of data with a total of two electrical contacts only, the capacitor in the capsule is used. The capacitor is charged by the electronic smoking device so that it can power the controller in the capsule during intermediate intervals, e.g. during intervals when the signal line is at ground voltage level during data transmission when it is not able to provide power to the controller.

Where a capacitor for powering the electronic controller 40 is provided, communication between the electronic controller 40 and the control electronics 14 of the electronic smoking device may be initiated by the control electronics 14 of the electronic smoking device providing a long pulse e.g. 100 ms, which charges the capacitor in the capsule 6.

Afterwards, the main unit can send information in a binary encoded form wherein "1" and "0" are represented by electrical levels, e.g. a "0" is represented by no power while a "1" is indicated by supplying power and wherein, e.g., all the pulses have the same length. The end of communication can be marked with a power-on pulse of a different duration. Alternatively, information may be sent by representing "1" and "0" by different power-on durations, with power-off phases in between for separating these pulses. In such an embodiment the power-off phases should be kept short, e.g. no longer than 2 ms, because during these phases the capacitor is not charged and rather serves as the power supply for the electronic controller 40 in the capsule 6.

Other embodiments using alternative data transfer schemes may be used. It will, however, be appreciated that where a controller 40 or 80 of a capsule 6 is powered via the discharge of a capacitor, suitable data signalling schemes should be designed accounting for the limitations of powering a controller 40 or 80 of a capsule 6 by virtue of the discharge of a capacitor. Thus for example it is preferable that suitable data transfer schemes use an initial period of higher voltage when first communicating so that the initial start signal might be utilised to charge the capacitor. Further it is preferable that power off phases should be kept short as during such phases the power needs for the controller 40 are provided through the discharge of the capacitor.

The electrical contacts for providing a means of electrical communication between the electronic controller 40 or 80 of the capsule 6 and the control electronics 14 of the electronic smoking device may be provided in a number of different ways.

For example, a non-conductive base material of the shell of the capsule 6 may be coated with a first conductive layer (or area) on the inside and a second conductive layer (or area) on the outside of the shell, providing two electrical contacts which are isolated from each other. When inserting such a capsule 6 into the electronic smoking device, the first conductive area of the shell may be contacted, e.g., by a metal part used for piercing the membrane in order to open a hole for passing the liquid. The second conductive area can be connected, e.g., via a support metal part holding the capsule.

In some embodiments the complexity of the capsule 6 may be reduced by utilising a metal foil enclosing a capsule 6 as one of the electrical contacts for incorporating the controller 40 within an electrical circuit and connecting the controller 40 with the battery 10 and/or the control electronics 14 of the electronic smoking device 1.

As described, the challenge response authentication requires only a few components and does not involve complex arithmetic or complex algorithms on either part. The control electronics of the electronic smoking device usually will already include a processor which is able to perform the authentication or otherwise will be able to do so at a small amount of extra cost. The controller of the capsule may also perform other tasks, e.g. for storing information on the actual amount of liquid in the capsule, so that it provides additional benefit and need not to be added exclusively for authentication purposes.

Thus, novel systems, components and methods have been shown and described. Various changes and substitutions may of course be made without departing from the spirit and scope of the invention. The invention, therefore, should not be limited except by the following claims and their equivalents.

The invention claimed is:

1. A system comprising:
    an electronic smoking device comprising:
        an electric power source for powering an atomizer configured to atomize a liquid supplied from a capsule mounted to the device, control electronics configured to control the atomizer, and a puff detector configured to indicate an aerosol inhaling puff to the control electronics; and
        a capsule, containing liquid to be supplied to an atomizer, the capsule being configured to be mounted to the electronic smoking device,
    wherein the capsule comprises:
        a controller, which is responsive when mounted to the electronic smoking device to receive data from and to transmit data to the control electronics of the electronic smoking device, via a communication device, the control electronics of the electronic smoking device and the controller of the capsule being configured to execute a challenge response authentication when the capsule is mounted to the device,
        wherein the capsule comprises a shell having an access port at a first end of the shell, wherein the access port is covered by a pierceable membrane, and
        wherein the pierceable membrane is provided on the first end of the shell, an intermediate wall in the shell provides a cavity in a second end of the shell, the cavity separated from the liquid, and the controller is in the cavity.

2. The system of claim 1, wherein the control electronics of the electronic smoking device and the controller of the capsule are configured to execute a challenge response authentication based on the use of a secret key and the control electronics of the electronic smoking device and the controller of the capsule contain the same secret key.

3. The system of claim 2, wherein upon authentication, one of the control electronics of the electronic smoking device and the controller of the capsule creates a random number, which is stored and also transmitted to the other one of the control electronics of the electronic smoking device and the controller of the capsule.

4. The system of claim 3, wherein upon authentication, one of the control electronics of the electronic smoking device and the controller of the capsule is configured to encrypt the random number, applying the secret key, and to transmit the encrypted random number to the other one of the control electronics of the electronic smoking device and the controller of the capsule.

5. The system of claim 4, wherein upon authentication, one of the control electronics of the electronic smoking device and the controller of the capsule receiving the encrypted random number is configured to compare the received encrypted random number with a computed encrypted random number, the computation applying the known random number and the known encryption including the secret key.

6. The system of claim 1, wherein the electric power source comprises a battery and the controller of the capsule is electrically connected to and powered by the battery of the electronic smoking device.

7. The system of claim 1, wherein the communication device of the capsule comprises electrical contacts.

8. The system of claim 1, wherein the atomizer is integrated into the capsule and the capsule comprises electrical contacts configured for connection to corresponding contacts of the electronic smoking device powering the atomizer.

9. The system of claim 1, wherein the power source comprises a battery.

10. An electronic smoking device comprising:
a housing containing an electric power source, a puff detector and a heater, electrically connected to control electronics;
a piercing tip adjacent to a first end of the housing;
a wick between the piercing tip and the heater; and
a capsule including a capsule electronic controller, and a liquid sealed within the capsule by a membrane;
wherein the membrane is pierced by the piercing tip when the capsule is attached to the housing, and the liquid is moved via the wick towards the heater;
the capsule electronic controller configured to receive data from and to transmit data to the control electronics in the housing, the control electronics in the housing and the capsule electronic controller configured to provide a response to an authentication challenge when the capsule is attached to the housing, the control electronics in the housing switching the heater on upon generation of an authentic reply to the authentication challenge, when the puff detector detects an inhaling puff on the device.

11. The device of claim 10 wherein the control electronics and the capsule electronic controller are configured to execute a challenge response authentication based on the use of a secret key and the control electronics the capsule electronic controller contain the same secret key.

12. The device of claim 10 wherein upon authentication, one of the control electronics and the capsule electronic controller creates a random number, which is stored and also transmitted to the other one of the control electronics and the capsule electronic controller.

13. The device of claim 10 with the capsule including a capacitor powering the capsule electronic controller.

14. The device of claim 10 with the membrane comprising a metal foil electrically connected to the electrical power source and to the capsule electronic controller.

* * * * *